United States Patent
Copeland

[15] 3,674,121
[45] July 4, 1972

[54] ENGAGEMENT CONTROL OF FRICTION DRIVES

[72] Inventor: Charles R. Copeland, Indianapolis, Ind.
[73] Assignee: General Motors Corporation, Detroit, Mich.
[22] Filed: Sept. 21, 1970
[21] Appl. No.: 73,757

[52] U.S. Cl. ..............................192/52, 91/468, 137/494, 192/85 R, 192/109 F, 303/21 F
[51] Int. Cl. .......................................................F16d 25/063
[58] Field of Search ..................192/52, 109 F, 85 R, 85 AA, 192/85 AB; 137/494; 303/21 F; 91/468

[56] References Cited

UNITED STATES PATENTS

| | | | |
|---|---|---|---|
| 3,025,717 | 3/1962 | Christenson | 192/109 F |
| 2,807,968 | 10/1957 | Forster | 192/109 F X |
| 3,042,165 | 7/1962 | Yokel | 192/109 F X |
| 3,215,236 | 11/1965 | Pensa | 137/494 X |
| 3,401,581 | 9/1968 | Chana | 192/109 F |

Primary Examiner—Allan D. Herrmann
Attorney—W. E. Finken, A. M. Heiter and D. F. Scherer

[57] ABSTRACT

A friction drive establishing device having an engagement control valve for controlling the development of pressure therein. The control valve includes a regulator valve slidably disposed in a valve bore for controlling engagement pressure in the friction device and a bias member for imposing a bias force on the regulator valve during engagement. A control valve is in fluid communication with the bias member which control valve functions to decrease the bias pressure imposed on the bias member when the slip speed of the friction device approaches zero thereby reducing the engagement pressure to accommodate the increase in the coefficient of friction.

8 Claims, 4 Drawing Figures

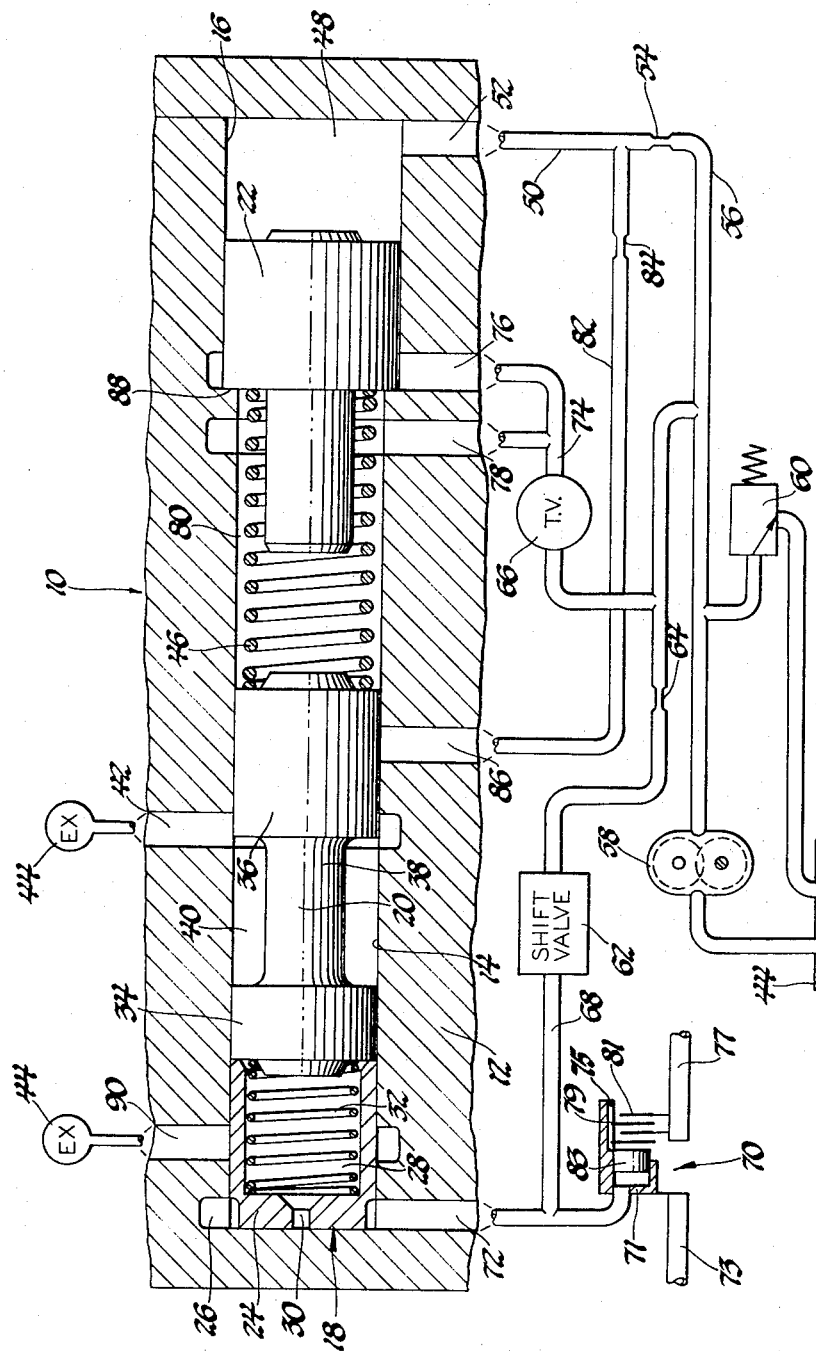
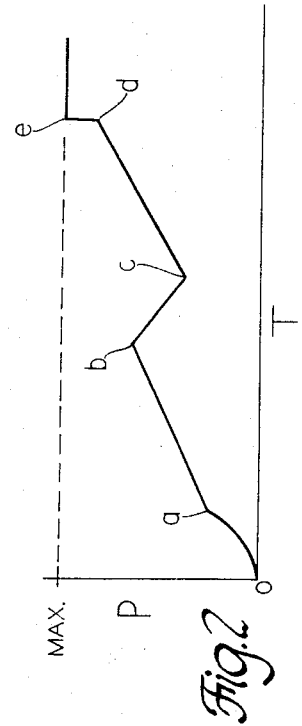
Fig. 1
Fig. 2
INVENTOR.
Charles R. Copeland
BY
Donald F. Scherer
ATTORNEY 3,674,121

ENGAGEMENT CONTROL OF FRICTION DRIVES

This invention relates to engagement controlled devices and more particularly to engagement controls providing a controlled engagement pressure schedule of a friction drive.

Prior art engagement control valves, or trimmer valves as they are commonly termed, generally provide a substantially constant pressure increase in the oncoming friction device. However, it has been found that it is more desirable to provide the following pressure schedule during the engagement of a friction drive device such as a clutch. An initial pressure rise followed by a constant or slightly decreasing pressure phase and a final pressure rise in the friction device. It is felt this engagement schedule accommodates the variation in friction coefficient that is present due to the speed changes or slip speed between friction discs during engagement. The present invention provides this desired scheduled through the use of a variable regulator valve for controlling the pressure in a friction device, a bias member which is pressurized to provide an initial high bias on the regulator valve, and a valve spool for eliminating the pressure bias during the final phase of engagement.

It is, therefore, an object of this invention to provide in an improved friction drive and control an engagement control valve for reducing the engagement pressure in the friction drive as the slip speed of the friction drive approaches zero during engagement and to increase the engagement pressure when the slip speed is zero after engagement.

Another object of this invention is to provide in an improved friction drive and control a fluid pressure actuated friction drive establishing device having relatively rotatable friction discs exhibiting a slip speed characteristic during engagement and a control for controlling the engagement of the friction drive establishing device including a pressure regulating valve, a bias member for imposing a bias on the regulating valve, and a control portion for reducing the bias as the slip speed of the friction discs approaches zero.

Another object of this invention to provide in an improved engagement control valve a regulator valve for controlling the pressure rise in a friction device, a bias member for imposing a high bias on the regulator valve during the initial phase of engagement and a spool valve for eliminating the high bias during the final phase of engagement.

Another object of this invention is to provide in an improved engagement control valve for a friction device having a slip speed characteristic during engagement, a regulator valve for controlling the engagement pressure in the friction device, a bias member for establishing a pressure bias on the regulator valve, and a control valve for controlling the pressure bias to cause an initial increase in engagement pressure, intermediate decrease in engagement pressure as the slip speed approaches zero, and a final increase in engagement pressure when the slip speed is at zero.

Another object of this invention is to provide in an improved engagement control valve a pressure regulator valve for controlling the pressure rate in a friction device at three rates, a pressure bias member for imposing a bias during one rate, and a spool control valve for controlling the pressure bias during a second phase and exhausting the pressure bias during the third phase.

These and other objects and advantages of the present invention will be more apparent from the following description and drawing in which FIG. 1 is a diagrammatic representation of an engagement control valve;

FIG. 2 is a curve showing one of the rate schedules;

Figure 3:
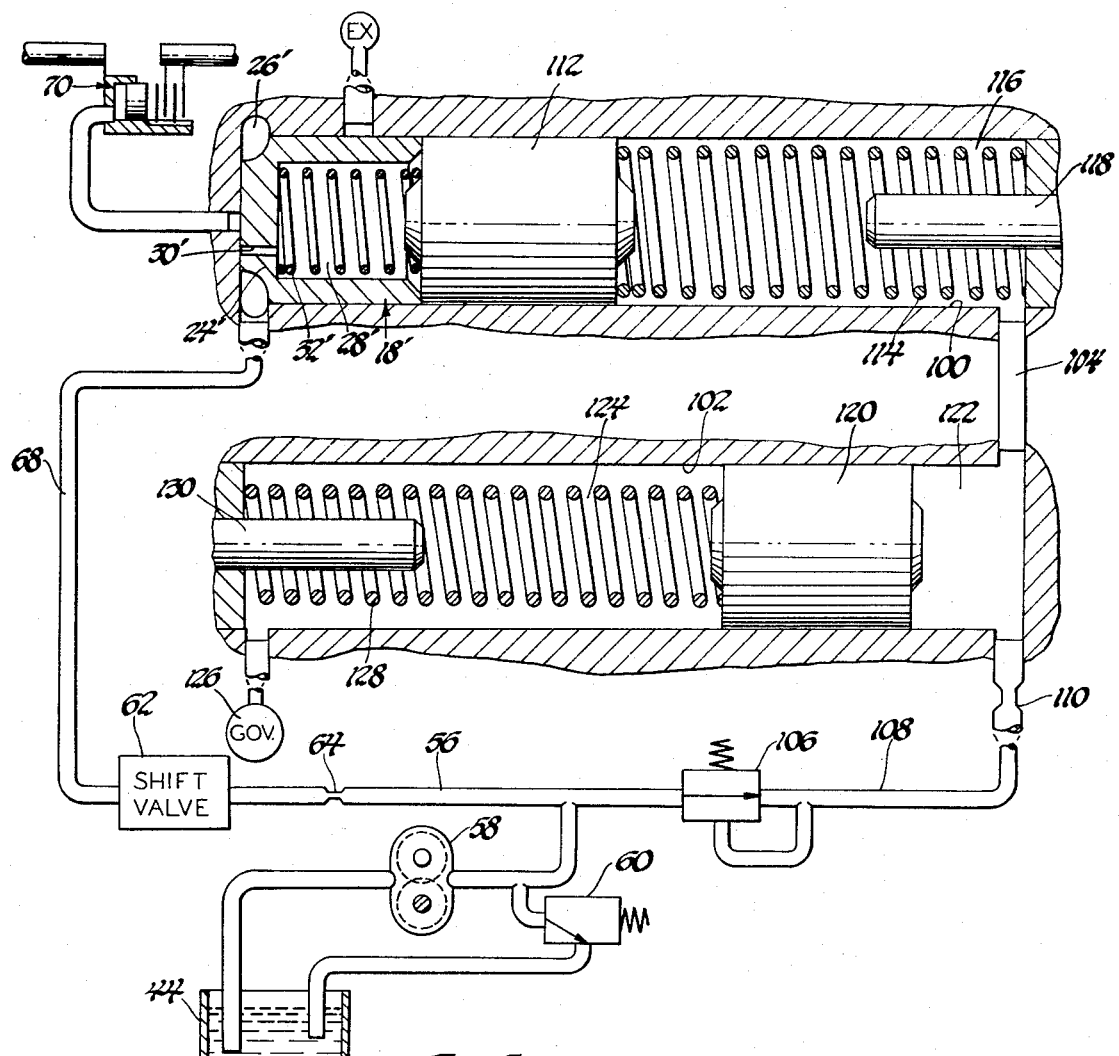
FIG. 3 is a diagrammatic representation of another engagement control valve.

Referring to FIG. 1 there is shown an engagement control valve or trimmer valve generally designated 10 including a valve body 12, a pair of valve bores 14 and 16, a regulator valve 18, a spool valve 20, and a bias member or pressure abutment 22. The bias member 22 is slidably disposed in the valve bore 16 to provide a slidable plug valve which imposes a bias on the regulator valve 18, as explained later in this specification. The regulator valve 18 includes a valve plug 24 slidably disposed in the bore 14 and cooperating therewith to form a regulated pressure chamber 26 which is in fluid communication with a secondary pressure chamber 28 via a restriction 30 in the plug 24. A helical spring 32 is compressed in the chamber 28 between the plug 24 and the spool valve 20.

The spool valve 20 includes a pair of equal diameter lands 34 and 36 slidably disposed in the valve bore 14 and a reduced portion 38 intermediate the lands 34 and 36. The reduced portion 38 cooperates with the valve bore 14 to form an exhaust chamber 40 which is in fluid communication via a passage 42 with a reservoir 44. A helical spring 46 is compressed between the land 36 of valve 20 and the bias member 22 which bias member 22 is slidably disposed in the valve bore 16 and cooperates therewith to form a bias chamber 48. The helical spring 46 has sufficient force stored therein to compress the spring 32 such that prior to pressure regulation by the regulator valve 18 the spool valve 20 abuts the plug 24.

The bias chamber 48 is in fluid communication with a bias passage 50 via a bias port 52. The bias passage 50 is in fluid communication through a restriction 54 with a main passage 56 which is supplied fluid pressure from a pump 58 which is operatively connected to the reservoir 44. The fluid pressure in the main passage 56 is controlled by a conventional regulator valve 60. The main passage 56 is also in fluid communication with a shift valve 62 through a restriction 64 and with a throttle valve 66.

The shift valve 62 is a conventional shift valve and may be automatically or manually manipulated by any known manner to deliver fluid pressure from main passage 56 to an engagement passage 68 which is connected to a fluid actuated friction drive device 70 and a regulated port 72 of the valve 10. The throttle valve 66 is a conventional throttle valve and may be manipulated in any well known manner to provide a fluid pressure that is proportional to engine torque demand or throttle position. The fluid pressure from the throttle valve 66 is delivered through a throttle control passage 74 to a pair of control ports 76 and 78 which are in fluid communication with a control chamber 80 formed in valve bore 14 between valve 20 and the bias member 22.

The fluid actuated friction drive device 70 has a housing 71 drivingly connected to an input shaft 73 and an output hub 75 drivingly connected to an output shaft 77. A plurality of friction discs 79 are drivingly connected with the housing 71 and alternately spaced of friction discs 81 which are drivingly connected with the output hub 75. A fluid actuated piston 83 is slidably disposed in the housing 71 and is in fluid communication with the engagement passage 68. Fluid pressure in passage 68 causes the piston 83 to engage the friction discs 79 and 81 thereby drive connecting the input shaft 73 and the output shaft 77. The coefficient of friction of the discs 79 and 81 increases during the engagement of the friction device 70 as the slip speed between the discs approaches zero. The rate of increase of the coefficient of friction is affected by a number of factors including the type of friction material and the type of lubricating fluid. The friction device 70 is illustrated as a clutch, however, this device could also be a reaction brake.

The fluid pressure in bias passage 50 is in fluid communication with a bias exhaust passage 82 through a restriction 84, which is larger than the restriction 54. The bias exhaust passage 82 is connected to a bias exhaust port 86 which is open to the valve bore 14. In the position shown, the bias member 22 of the valve 10 is subjected to fluid pressure in the bias chamber 48 to move the bias member 22 against a shoulder 88 between the bores 14 and 16 to impose a load on the spring 46 which load is transmitted through the spool valve 20 to the regulator valve 18. When the shift valve 62 is opened to permit fluid to enter passage 68, the regulator valve 18 and the friction device 70 will be subjected to fluid pressure. Fluid pressure in the chamber 26 will cause the regulator valve 18 to move in the bore 14 until an exhaust port 90 is opened thereby preventing further increase in pressure in the regulator chamber 26 and the friction device 70. The fluid pressure in the regulator chamber 26 is communicated slowly to the secondary chamber 28 via the restriction 30. As the pressure develops in the secondary chamber 28, the spool valve 20 and the regulator valve 18 will separate thereby increasing the force imposed by the spring 46 which will cause the plug 24 to decrease the opening of the exhaust port 90 to provide pressure regulation in passage 68. The pressure in the secondary chamber 28 will continue to increase as determined by the orifice 30, thereby causing further separation between the regulator plug 24 and the spool valve 20. This causes an increase in pressure in the friction device 70. After the spool valve 20 has moved away from the plug 24 a sufficient amount, the bias exhaust port 86 will be opened by the valve land 36 to the exhaust chamber 40 to permit exhausting of the biased exhaust passage 82 through the exhaust port 42. Since the restriction 84 has a larger diameter than the restriction 54, the bias chamber 48 will be rapidly exhausted thereby permitting the spring 46 to rapidly move the bias member 22 from the shoulder 88 to the end of valve bore 16.

The movement of the bias member 22 reduces the bias force imposed by the spring 46 on the regulator valve 18 so that the pressure in regulated chamber 26 will be opened to exhaust to permit a slight decrease in pressure in the friction device 70. After the pressure has fallen slightly, the regulator valve 18 will be at equilibrium and the pressure in passage 68 and, therefore, friction device 70 will begin to increase. As the pressure in passage 68, the friction device 70 and the regulated chamber 26 begins to increase, further separation between the regulator plug 24 and the spool valve 20 will occur thus increasing the force imposed by the spring 46. This pressure increase will continue until the land 36 of spool valve 20 abuts the bias member 22 which is abutting the end of bore 16 thereby preventing any further increase in the force of spring 46. When the spool valve 20 and the bias member 22 are in contact, any increase in pressure in the secondary chamber 28 will cause the exhaust port 90 to be closed and the pressure in passage 68 will be raised to the value of the pressure in main passage 56. Thus, it can be seen from the above description that the pressure in the friction device 70 will initially be increased followed by a slight decrease and then a final increase.

In certain pressure controls for friction devices, the engagement pressure is preferably proportional to engine torque demand or throttle position. In such controls the throttle valve 66 may be used. This valve provides a throttle pressure proportional to torque demand. The throttle pressure is directed to the control chamber 80 so that a force proportional to torque demand is imposed as a bias on the regulator valve 18 through the spool valve 20.

Referring to the graph or curve of pressure (P) and time (T) shown in FIG. 2, the pressure rise in the friction device 70, as controlled by the trimmer valve 10, is seen. The pressure rise from zero to point *a* is controlled by the resistance of the friction device, for example, the friction forces resisting movement of internal components and the fill time for the device, and the restrictions 64 and 30. The pressure at point *a* is determined by the preload of spring 46. The rate of pressure change from points *a* to *b* is controlled by the restriction 30 and the volume of chamber 28, which cooperate to form a flow control, and the rate of spring 46. The rate of pressure change from points *b* to *c* is determined by the flow control restrictions 30, 84 and 54, the rate of the spring 46 and the volume of chamber 28. The pressure at point *c* is determined by the preload in spring 46 when the bias member 22 is abutting the end of bore 16 and the spool valve 20 is positioned intermediate plug 24 and bias member 22. The rate of pressure change from points *c* to *d* is determined by the flow control restriction 30, the volume of chamber 28 and the rate of spring 46. The pressure at point *d* is determined by the load on spring 46 when the spool valve 20 abuts the bias member 22. The pressure change from *d* to *e* is determined by various system factors and components, such as deflection of components in the friction device, the time required to fully pressurize passage 68, chamber 28, and the chamber for the piston in the friction device 20. The pressure at point *e* is determined by the regulator valve 60. The function generated by these flow control members cooperating with the valving closely approximate a sinusoidal or parabolic shaped curve.

The engagement control valve shown in FIG. 3 is a governor control and or speed sensitive trimmer valve which provides the desired control scheduled within a wide range of slip speeds and coefficient of friction. Many of the components used with this engagement control valve are identical with components shown in FIG. 1 and have, therefore, been given the same numerical designation so that a description thereof is not necessary.

The engagement control valve has a pair of valve bores 100 and 102 which are connected by a fluid conduit 104. The conduit 104 is in fluid communication with the pump 58 via passage 56, a conventional pressure reducing valve 106, a passage 108 and a restriction 110. A regulator valve generally designated 18' is slidably disposed in valve bore 100 and includes a plug valve 24' slidably disposed in the bore 100, a restricted passage 30' and a compression spring 32'. The restricted passage 30' provides fluid communication between a regulated pressure chamber 26' in fluid communication with the source 58 and the friction device 70 and a secondary fluid chamber 28'. A compression spring 32' abuts the plug 24' and a bias member 112 which is slidably disposed in the bore 100. The bias member 112 is moved to the left in bore 100 by a compression spring 114 when there is no pressure on the secondary chamber 28'. The bias member 112 cooperates with the valve bore 100 to form a bias chamber 116 which is in fluid communication with the passage 104. A stop member 118 abuts the end of bore 100 and limits the rightward movement of the bias member 112.

A governor controlled slide valve 120 is slidably disposed in the chamber 102 and cooperates therewith to form a bias chamber 122 on one side of the valve 120 in fluid communication with the passage 104 and a governor chamber 124 on the other side of valve 120 in fluid communication with an engine driven or input governor 126. A compression spring 128 is disposed in the governor chamber 124 abutting the valve 120 and one end of the bore 102. A stop member 130 abuts the one end of bore 102 and limits the leftward movement of the valve 120.

The reducing valve 106 regulates the pressure in passage 108 at a constant value and also permits the flow of fluid to and from the passage 104 through the restriction 110.

Figure 4:
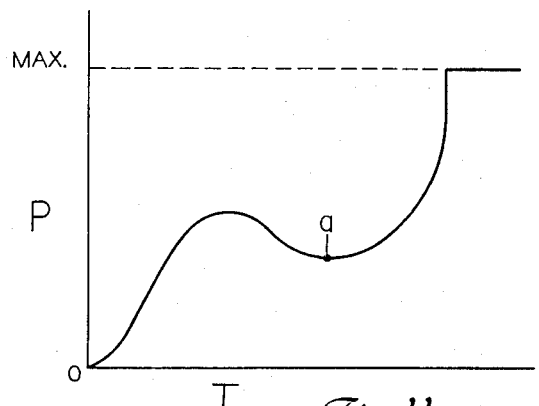
FIG. 4 is a curve showing another rate schedule.

During operation the shift valve 62 is operated in a conventional manner to permit fluid communication between the pump 58 and the passage 68 which is connected with the friction device 70 and the regulated pressure chamber 26'. As the pressure increases in the friction device 70 and the regulated pressure chamber 26', the plug valve 24' will be moved to the right against the force in spring 114 until the exhaust connection 44 is opened thereby limiting the pressure in the chamber 26' and the friction device 70. As described above, in FIG. 1 the fluid pressure in the regulated pressure chamber 26' passes through the restriction 30' to the secondary chamber 28' where it reacts on the plug 24' and the bias member 112 to cause separation between these two members. The development of pressure in the secondary chamber 28' causes a further increase in pressure in the regulated pressure chamber 26'. The pressure in chamber 26' will vary according to the schedule shown in FIG. 4. The schedule shown in FIG. 4 is determined by the governor pressure in chamber 124 and the bias pressure in chambers 116 and 122.

When the shift valve 62 is initially opened the pressure in chamber 26' will rise to cause initial engagement of the friction device 70. However, as the friction device 70 begins engagement the vehicle engine speed will begin to decrease because of the speed ratio change that is occurring in the transmission between the engine and the drive wheels. As the engine speed decreases the governor pressure in chamber 124 will decrease so that the bias pressure in chamber 122 will cause the plug 120 to move to the left. Due to the increase in coefficient of friction of the oncoming friction device 70 the engine speed and therefore governor pressure, will decrease more rapidly as the friction discs in the friction device 70 approach zero slip speed. This rapid reduction in governor pressure will permit the valve 120 to move to the left quite rapidly thereby reducing the pressure in chambers 114, 122 and passage 104. The restriction 110 prevents the fluid pressure in chambers 114, 122 and passage 124 from being increased rapidly by the fluid pressure in passage 108, therefore the bias member 112 will move to the right quite rapidly reducing the bias on the regulator valve 18' so that a reduction in pressure in the regulated chamber 26' will occur. The pressure in the regulated chamber 26' and the friction device 70 will continue to decrease until zero slip speed is achieved in the friction device 70 which will occur at point $a$ on the curve shown in FIG. 4. When the friction device 70 has been fully engaged the governor speed and therefore the governor pressure 124 will cease to decrease and remain at a substantially constant value for the remainder of the engagement schedule, thereby causing the pressure in chamber 122 to increase before further movement of plug 120 can occur. This will cause an increase in pressure in bias chamber 116 which will result in an increase in regulated pressure in chamber 26'. The pressure in chamber 26' will then continue to increase until maximum system pressure is attained.

In some friction devices generally the coefficient of friction will not remain sufficiently constant to maintain a good smooth shift throughout the life of the friction device. Excessive changes in the coefficient of friction can cause a change in shift smoothness. The engagement control valve shown in FIG. 3 is responsive to input speed which varies with changes in coefficient of friction and will therefore provide a smooth shift throughout the life of the friction device. With the engagement control valve shown in FIG. 3 as the bias member 112 and the governor plug 120 travel at the same rate the modulating pressure of biasing pressure in chamber 116 and remain constant to provide a steady increase in regulated pressure in chamber 26' as determined by the rate of spring 114. With an increase in rate of drop of governor pressure the bias pressure in chamber 116 will decrease due to the fact that the governor plug 120 is moving more rapidly than the bias member 112. During this time fluid flows through the restriction 110 from passage 108 to passage 104. With a decreased rate of drop in governor pressure the bias pressure in chamber 116 will increase since bias member 112 must move more rapidly than governor plug 120. During this time the fluid in passage 104 will flow through the restriction 110 to the passage 108.

Obviously, many modifications and variations are possible in light of the above description and drawing. Therefore, it should be understood that within the scope of the appended claims the invention may be practiced otherwise than as specifically described.

What is claimed is:

1. An engagement control device for friction drive establishing means comprising a source of fluid pressure in fluid communication with the friction means; and valve means including regulator valve means in fluid communication with said source for controlling fluid pressure in the friction means, movable bias means including slide valve means in fluid communication with said source for maintaining a pressure bias force on said regulator valve means during initial engagement of the friction means, and spool valve means disposed between said regulator valve means and said slide valve means for transmitting the bias force to said regulator valve means and being in fluid communication with said slide valve means for controlling the pressure bias force imposed by said slide valve means during final engagement of the friction means.

2. An engagement control valve comprising a valve body having a bore therein; regulator valve means slidably disposed in said bore; bias means including plug means slidably disposed in said bore; spool valve means slidably disposed in said bore intermediate said regulator valve means and said plug means; first spring means intermediate said regulator valve means and said spool valve means; second spring means intermediate said plug means and said spool valve means; regulated pressure chamber means adjacent said regulator valve means; bias pressure chamber means adjacent said plug means; exhaust passage means in said valve body circumjacent said spool valve means; and fluid passage means connecting said bias pressure chamber means and said spool valve means and said spool valve means being movable in response to fluid pressure in said regulated pressure chamber to exhaust said bias pressure chamber through said exhaust passage means.

3. An engagement control device for a friction drive establishing means comprising a source of fluid pressure in fluid communication with friction means; engagement control valve means including a valve bore, regulator valve means slidably disposed in said bore including restriction means, regulated pressure chamber means in fluid communication with said friction means and said restrictions means, spool valve means slidably disposed in said bore adjacent said regulator valve means, secondary pressure chamber means in fluid communication with said restriction means intermediate said regulator valve means and said spool valve means, first spring means located in said secondary pressure chamber means contacting said regulator valve means and said spool valve means, exhaust chamber means in said valve bore controlled by said spool valve means, pressure bias means slidably disposed in said valve bore, bias chamber means adjacent said bias means in fluid communication with said source for imposing a pressure bias on said regulator valve means, second spring means contacting said bias means and said spool valve means for moving said spool valve means into contact with said regulator valve means and for transmitting the pressure bias thereto; and exhaust passage means in fluid communication with said bias chamber and said spool valve means; said spool valve means being movable in response to fluid pressure in said secondary pressure chamber to permit fluid communication between said exhaust passage means and said exhaust chamber means to exhaust the pressure bias on said regulator valve means.

4. An engagement control valve for controlling fluid pressure supplied by a fluid source to a friction drive establishing means comprising; regulator valve means for controlling the pressure increase in said friction means at one rate during an initial phase of engagement, second rate during an intermediate phase of engagement, and at a third rate during a final phase of engagement, pressure bias means in fluid communication with the source for imposing a pressure bias on said regulator valve means during the initial phase, spool valve means and restriction means for controlling the pressure bias during the intermediate phase, and exhausting the pressure bias during the final phase.

5. An engagement control valve for controlling fluid pressure supplied by a fluid source to a friction drive establishing means comprising regulator valve means for controlling the pressure increase in the friction means at one rate during an initial phase of engagement, at a second rate during an intermediate phase of engagement, and at a third rate during a final phase of engagement, pressure abutment means, bias means operatively connected to said pressure abutment means, spool valve means operatively connected to said bias means and said regulator valve means, first flow control means on said regulator valve means for controlling said first rate and said third rate, and second flow control means operatively connected with and controlled by said spool valve means and cooperating with said first flow control means for controlling said second rate.

6. An engagement control device for friction drive establishing means having relatively rotatable members which have a slip speed during engagement and rotate in unison at full engagement said control comprising a source of fluid pressure in fluid communication with the friction means for engaging the friction means and valve means including regulator valve means in fluid communication with said source for controlling the engagement pressure in the friction means, movable bias means including slide valve means in fluid communication with said source for maintaining a pressure bias force on said regulator valve means during engagement of the friction means, and control valve means operatively connected in fluid communication with said slide valve means for controlling the pressure bias force imposed by said slide valve means during engagement of the friction means to decrease the engagement pressure as the slip speed approaches zero.

7. An engagement control device for friction drive establishing means comprising a source of fluid pressure selectively in fluid communication with the friction means; input governor means for providing a governor pressure signal; regulator valve means in fluid communication with said friction means for controlling the fluid pressure therein; moveable bias means operatively connected with said regulator valve means and being responsive to a bias pressure for maintaining a bias on said regulator valve means, and control means including a slide valve responsive to the governor pressure signal for controlling the bias pressure on said bias means.

8. An engagement controlled friction drive comprising fluid pressure operated friction drive establishing means having a slip speed characteristic during engagement that is reduced to zero when the friction drive establishing means is engaged and a coefficient of friction characteristic that increases as the slip speed approaches zero; and engagement control means for controlling the fluid pressure in said friction drive establishing means to reduce the fluid pressure when the slip speed approaches zero and the coefficient of friction increases and to increase the fluid pressure when the slip speed is zero.

* * * * *